(12) United States Patent
Zhu et al.

(10) Patent No.: US 12,426,118 B2
(45) Date of Patent: *Sep. 23, 2025

(54) METHOD AND APPARATUS FOR USER PLANE PATH FAILURE AND RECOVERY HANDLING

(71) Applicant: Telefonaktiebolaget LM Ericsson (publ), Stockholm (SE)

(72) Inventors: Jinyin Zhu, Shanghai (CN); Yingjiao He, Shanghai (CN); Kai Zhang, Shanghai (CN); Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,208

(22) Filed: Jan. 16, 2024

(65) Prior Publication Data
US 2024/0237112 A1     Jul. 11, 2024

Related U.S. Application Data

(63) Continuation of application No. 17/436,750, filed as application No. PCT/CN2019/104396 on Sep. 4, 2019, now Pat. No. 11,910,459.

(30) Foreign Application Priority Data

Mar. 8, 2019  (WO) .............. PCT/CN2019/077534

(51) Int. Cl.
*H04W 76/18*     (2018.01)
*H04L 43/065*    (2022.01)
(Continued)

(52) U.S. Cl.
CPC ............ *H04W 76/18* (2018.02); *H04L 43/065* (2013.01); *H04L 43/0823* (2013.01); *H04W 76/19* (2018.02); *H04W 88/14* (2013.01)

(58) Field of Classification Search
CPC ..... H04W 76/18; H04W 76/19; H04W 88/14; H04L 43/065; H04L 43/0823
(Continued)

(56) References Cited

U.S. PATENT DOCUMENTS 10,321,382 B2 *  6/2019  Teyeb ............... H04W 36/0016
10,979,285 B2 *  4/2021  Yin .................. H04W 76/22
(Continued)

FOREIGN PATENT DOCUMENTS

| CN | 106465159 A | 2/2017 |
| JP | 2018133777 A | 8/2018 |
| WO | 2018070436 A1 | 4/2018 |

OTHER PUBLICATIONS

3GPP, "3rd Generation Partnership Project; Technical Specification Group Core Network and Terminals; Interface between the Control Plane and the User Plane Nodes; Stage 3 (Release 14)", 3GPP TS 29.244 V14.7.0, Mar. 2019, 1-179.
(Continued)

*Primary Examiner* — Tauqir Hussain
(74) *Attorney, Agent, or Firm* — Murphy, Bilak & Homiller, PLLC

(57) ABSTRACT

Embodiments of the present disclosure provide methods and apparatus for user plane path failure and recovery handling. A method comprises detecting that a user plane path is failed; and monitoring the user plane path within a configurable period to determine whether the user plane path is recovered or not.

6 Claims, 12 Drawing Sheets

(51) Int. Cl.
*H04L 43/0823* (2022.01)
*H04L 43/0829* (2022.01)
*H04W 76/19* (2018.01)
*H04W 88/14* (2009.01)

(58) Field of Classification Search
USPC .......................................................... 709/224
See application file for complete search history.

(56) References Cited

U.S. PATENT DOCUMENTS

| | | | |
|---|---|---|---|
| 2012/0087235 | A1 | 4/2012 | Smith et al. |
| 2012/0243544 | A1 | 9/2012 | Keesara |
| 2014/0204909 | A1* | 7/2014 | Cheng ................... H04W 8/082 370/331 |
| 2015/0163090 | A1* | 6/2015 | Tsubouchi .......... H04L 41/0659 370/218 |
| 2016/0269224 | A1* | 9/2016 | Liu .......................... H04L 45/28 |
| 2017/0280501 | A1* | 9/2017 | Xu ..................... H04W 36/0069 |
| 2018/0316522 | A1* | 11/2018 | Chen ....................... H04L 12/66 |
| 2020/0015079 | A1* | 1/2020 | Li ....................... H04W 12/041 |
| 2020/0053828 | A1* | 2/2020 | Bharatia ............... H04W 76/11 |
| 2023/0083441 | A1* | 3/2023 | Lei ....................... H04L 1/0083 370/235 |

OTHER PUBLICATIONS

3GPP, "3rd Generation Partnership Project; Technical Specification Group Core Network and Terminals; Restoration procedures (Release 15)", 3GPP TS 23.007 V15.2.0, Mar. 2019, 1-107.

3GPP, "3rd Generation Partnership Project; Technical Specification Group Core Network and Terminals; 5G System; Restoration Procedures (Release 15)", 3GPP TS 23.527 V15.0.0, Sep. 2018, 1-16.

3GPP, "3rd Generation Partnership Project; Technical Specification Group Core Network and Terminals; Interface between the Control Plane and the User Plane Nodes; Stage 3 (Release 15)", 3GPP TS 29.244 V15.5.0, Mar. 2019, 1-198.

3GPP, "3rd Generation Partnership Project; Technical Specification Group Core Network and Terminals; Interface between the Control Plane and the User Plane Nodes; Stage 3 (Release 15)", 3GPP TS 29.244 V15.4.0, Dec. 2018, 1-194.

3GPP, "3rd Generation Partnership Project; Technical Specification Group Core Network and Terminals; Restoration procedures (Release 14)", 3GPP TS 23.007 V14.5.0, Sep. 2018, 1-106.

3GPP, "3rd Generation Partnership Project; Technical Specification Group Core Network and Terminals; Restoration procedures (Release 15)", 3GPP TS 23.007 V15.1.0, Sep. 2018, 1-107.

3GPP, "3rd Generation Partnership Project; Technical Specification Group Services and System Aspects; System Architecture for the 5G System; Stage 2 (Release 15) 3GPP TS 23.501 V15.4.0", 3GPP TS 23.501 V15.4.0, Dec. 2018, 1-236.

Alcatel-Lucent, et al., "Signalling path failure handling", 3GPP TSG CT4 Meeting #54, C4-112135, St Julians, Malta, Aug. 22-26, 2011, 1-7.

Ericsson, et al., "S1-U Path Failure Enhancement", 3GPP TSG CT WG4 Meeting #86, C4-186426, (was C4-186267), West Palm Beach, US, Aug. 20-24, 2018, 1-5.

Nokia, et al., "Packet Detection Information", 3GPP TSG CT Meeting #78, CP-173113, (Revision of C4-176210), Lisbon, Portugal, Dec. 18-19, 2017, 1-17.

Unknown, Author, "ETSI TS 123 007 V14.5.0", Digital cellular telecommunications system (Phase 2+) (GSM); Universal Mobile Telecommunications System (UMTS); LTE; Restoration procedures (3GPP TS 23.007 version 14.5.0 Release 14), Oct. 2018, 1-106.

Unknown, Author, "IE Name Corrections", 3GPP TSG-CT WG4 Meeting #89, C4-190416, Montreal, Canada, Feb. 25-Mar. 1, 1-12.

Unknown, Author, "LTE; Interface between the Control Plane and the User Plane nodes", ETSI TS 129 244 V15.2.0 (3GPP TS 29.244 version 15.2.0 Release 15), Jul. 2018, 1-184.

Unknown, Author, "User plane path failure handling", 3GPP TSG CT4 Meeting #54 C4-111695, St Julians, Malta, Aug. 22-26, 2011, 1-3.

Unknown, Author, "Proposal of Sequence Number Marking in the User Plane Function", 3GPP TSG CT4 Meeting #85 C4-184304, Osaka, Japan, May 21-25, 2018, 1-13.

\* cited by examiner

| Octet 1 and 2 | User Plane Path Failure IE Type = 102 (decimal) | | | | | | |
| Octets 3 and 4 | Length = n | | | | | | |
| Information elements | P | Condition / Comment | Appl. | | | | IE Type |
| | | | Sxa | Sxb | Sxc | N4 | |
| Remote GTP-U Peer | M | This IE shall include the IP address of the remote GTP-U peer towards which a user plane path failure has been detected. More than one IE with this type may be included to represent multiple remote GTP-U peers towards which a user plane path failure has been detected. | X | X | - | X | Remote GTP-U Peer |
| Destination Interface | C | This IE shall identify the interface (i.e., Access or Core) of the sending node which is associated with the user plane path failure. | X | X | - | X | Interface |
| Network Instance | C | This IE shall identify the network instance of the sending node which is associated with the user plane path failure. | X | X | - | X | Network Instance |

FIG. 14

METHOD AND APPARATUS FOR USER PLANE PATH FAILURE AND RECOVERY HANDLING

RELATED APPLICATIONS

This application is a continuation of U.S. application Ser. No. 17/436,750 filed on 7 Sep. 2021, which is a U.S. National Phase application of PCT/CN2019/104396 filed 4 Sep. 2019, which claims foreign priority to PCT/CN2019/077534 filed 8 Mar. 2019. The entire content of each aforementioned application is incorporated herein by reference.

TECHNICAL FIELD

The non-limiting and exemplary embodiments of the present disclosure generally relate to the technical field of communications, and specifically to methods and apparatuses for user plane path failure and recovery handling.

BACKGROUND

This section introduces aspects that may facilitate a better understanding of the disclosure. Accordingly, the statements of this section are to be read in this light and are not to be understood as admissions about what is in the prior art or what is not in the prior art.

In a communication network, when a user plane (UP) node detects that a user plane path is failed, the user plane function node may send a failure report of the user plane path to a control plane (CP) node. For example, 3rd Generation Partnership Project (3GPP) TS 29.244 V15.4.0 has defined a Node Report procedure where UP function can report the User Plane Path Failure to the CP function, the disclosure of which is incorporated by reference herein in its entirety. As defined in Table 7.4.5.1.2-1 of 3GPP TS 29.244 V15.4.0, User Plane Path Failure information element (IE) within Packet Forwarding Control Protocol (PFCP) Node Report Request comprises "Remote GTP-U (general packet radio service (GPRS) Tunneling Protocol (GTP) user plane) Peer". This IE shall include the Internet protocol (IP) address of the remote GTP-U peer towards which a user plane path failure has been detected. More than one IE with this type may be included to represent multiple remote GTP-U peers towards which a user plane path failure has been detected.

Subclauses 20.3.1 and 20.3.4 of 3GPP TS 23.007 V15.1.0 have defined user plane path failure detection and handling, the disclosure of which is incorporated by reference herein in its entirety.

As described in subclauses 20.3.1 of 3GPP TS 23.007 V15.1.0, GTP-U entities shall support detection of path failure by using Echo Request/Echo Response messages in the following way. A path counter shall be reset each time an Echo Response is received on the path and incremented when the T3-RESPONSE timer expires for any Echo Request message sent on the path. The path shall be considered to be down if the counter exceeds N3-REQUESTS.

Upon detecting a path failure, the network node should notify the failure via the Operation and Maintenance system and may either
    delete the bearer contexts associated with the path in failure; or
    maintain the bearer contexts associated with the path in failure during an operator configurable maximum path failure duration. The network node shall delete the maintained resources if the path is still down when this duration expires.

As described in subclauses 20.3.4 of 3GPP TS 23.007 V15.1.0, with a split serving gateway (SGW) or packet data network gateway (PGW), user plane path failure detection and handling shall be supported as specified in subclause 20.3.1 of 3GPP TS 23.007 V15.1.0 of with the following additional requirements:
    upon detecting a GTP-U user plane path failure, the SGW user plane (SGW-U) or PGW user plane (PGW-U) shall report the user plane path failure to the SGW control plane (SGW-C) or PGW control plane (PGW-U) respectively, by sending an Sx Node Report Request (see 3GPP TS 29.244) including a User Plane Path Failure Report with the IP address of the remote GTP-U peer(s) towards which a failure has been detected;
    upon being notified about the user plane path failure, when deciding to delete the bearer contexts associated with the path in failure, the SGW-C or PGW-C shall modify or delete the affected Sx sessions in the SGW-U or PGW-U.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some problems with the existing user plane path failure handling as described in subclauses 20.3.1 and 20.3.4 of 3GPP TS 23.007 V15.1.0. For example, the CP function may be configured with an operator configurable maximum path failure duration, so only when the period is expired, the CP function will then decide to delete the bearer contexts or protocol data unit (PDU) sessions associated with the user plane path. While after the User Plane function has reported the path failure, the user plane path failure may be recovered during the period of an operator configurable maximum path failure duration. In this case, CP triggered deleting of the bearer contexts or PDU sessions has no value but instead adds signaling in the network and impacts the user experience. In addition, the information carried in User Plane Path Failure Report IE only includes Remote GTP-U Peer information but it does not include destination interface IE and network instance IE as included in Forwarding Action Rules. This will make it inefficient and costly for CP function to identify the associated bearers or PDU sessions. Furthermore, if the remote IP address is overlapping with each other (e.g., remote S1-U IP address is overlapping with remote S5-U IP address or if one remote S1-U IP in IP domain X is overlapping with another remote S1-U IP address in IP domain Y), CP function cannot identify the associated bearers or PDU sessions correctly.

To overcome or mitigate at least one above mentioned problems or other problems or provide a useful solution, the embodiments of the present disclosure propose an improved user plane path failure and recovery handling solution.

In an embodiment, when UP function detects the user plane path failure, UP function delays the user plane path failure report to the CP function for a configurable period for example corresponding to operator configurable maximum path failure duration in 3GPP TS23.007 20.3.1. Within this period, if the user plane path recovers, UP function does not report the user plane path failure. The period that UP function waits for is either provisioned by CP function or locally configured in UP function. The CP function and UP function may exchange the capability of the support of the delayed user plane path report during association setup or update procedure.

In an embodiment, UP function reports the user plane path failure immediately when it is detected. Upon receiving the report of user plane path failure, the CP function includes a new indication to require the UP function to continue to monitor the failed user plane path for an operator configurable period for example corresponding to operator configurable maximum path failure duration in subclause 20.3.1 of 3GPP TS 23.007 V15.1.0, and to report the user plane path recovery if the path has recovered. Before the period expires, if UP function detects that the user plane path has been recovered, UP function triggers a node report procedure to report the User Plane Path recovery with a new Node Report Type, e.g., User Plane Path Recovery Report. In addition, the CP function and UP function may exchange the capability of the support of the user plane recovery report during association setup or update procedure.

In an embodiment, information which includes the Destination interface IE and network instance IE are added into User Plane Path Failure Report IE and User Plane Path Recovery Report.

In a first aspect of the disclosure, there is provided a method at a user plane function node. The method comprises detecting that a user plane path is failed; and monitoring the user plane path within a configurable period to determine whether the user plane path is recovered or not.

In an embodiment, before the step of detecting that a user plane path is failed, the method may further comprise obtaining the configurable period.

In an embodiment, obtaining the configurable period may comprise obtaining the configurable period locally when the configurable period is configured locally in the user plane function node; or obtaining the configurable period from a control plane function node.

In an embodiment, when the configurable period is obtained from the control plane function node, the configurable period is obtained from at least one of a Packet Forwarding Control Protocol (PFCP) association setup request, a PFCP association setup response, a PFCP association update request and a PFCP association update response.

In an embodiment, the method may further comprise not sending a failure report of the user plane path to a control plane function node when the user plane path is recovered within the configurable period; or sending the failure report of the user plane path to the control plane function node when the user plane path is not recovered within the configurable period.

In an embodiment, the method may further comprise exchanging capability of support of delayed user plane path failure report feature with a control plane function node during an association setup procedure or an association update procedure between a control plane function and the user plane function.

In an embodiment, the capability of support of delayed user plane path failure report feature is indicated by a feature bit.

In an embodiment, after the step of detecting that a user plane path is failed, the method may further comprise sending a failure report of the user plane path to a control plane function node; receiving the configurable period and an indication to report a recovery report of the user plane path from the control plane function node; and sending a recovery report of the user plane path to the control plane function node when the user plane path is recovered within the configurable period.

In an embodiment, the failure report of the user plane path may be included in a Packet Forwarding Control Protocol (PFCP) node report request message, the configurable period and the indication are included in a PFCP node report response message, and the recovery report of the user plane path is included in another PFCP node report request message.

In an embodiment, the recovery report of the user plane path may include information of an Internet protocol address, a destination interface and a network instance of a sending node towards which the user plane path has been recovered from failure, wherein the destination interface identifies an access or core interface of the sending node.

In an embodiment, the method may further comprise exchanging capability of support of user plane path recovery report feature with the control plane function node during an association setup procedure or an association update procedure between the control plane function node and the user plane function node.

In an embodiment, the capability of support of user plane path recovery report feature is indicated by a feature bit.

In an embodiment, the failure report of the user plane path may include information of an Internet protocol address, a destination interface and a network instance of a sending node towards which the user plane path failure has been detected, wherein the destination interface identifies an access or core interface of the sending node.

In an embodiment, the method may further comprise the user plane function node comprises a packet data network gateway (PGW) user plane (PGW-U) node and the control plane function node comprises a PGW control plane (PGW-C) node, or the user plane function node comprises a serving gateway (SGW) user plane (SGW-U) node and the control plane function node comprises a SGW control plane (SGW-C) node, or the user plane function node comprises a User plane Function (UPF) node and the control plane function node comprises a Session Management Function (SMF) node.

In a second aspect of the disclosure, there is provided a method at a control plane function node. The method comprises sending a configurable period to a user plane function node, wherein the configurable period is used by the user plane function node to monitor a user plane path within the configurable period to determine whether the user plane path is recovered or not after detecting that the user plane path is failed; and receiving a monitoring result from the user plane function node.

In an embodiment, the monitoring result may include a failure report of the user plane path, the method may further comprise deleting bearer contexts or protocol data unit (PDU) sessions associated with the user plane path immediately.

In an embodiment, before the step of sending a configurable period to a user plane function node, the method may further comprise receiving a failure report of the user plane path from the user plane function node; and marking bearer contexts or protocol data unit (PDU) sessions associated with the failed user plane path; and sending to the user plane function node an indication to report a recovery report of the failed user plane path.

In an embodiment, the failure report of the user plane path is received in a Packet Forwarding Control Protocol (PFCP) node report request, and the configurable period and the indication are sent in a PFCP node report response.

In an embodiment, when the monitoring result includes a recovery report of the user plane path, the method may further comprise keeping bearer contexts or protocol data unit (PDU) sessions associated with the user plane path.

In an embodiment, when the control plane function node does not receive the monitoring result within the configurable period, the method may further comprise deleting bearer contexts or protocol data unit (PDU) sessions associated with the user plane path immediately.

In an embodiment, the method may further comprise exchanging capability of support of user plane path recovery report feature with the user plane function node during an association setup procedure or an association update procedure between the control plane function node and the user plane function node.

In a third aspect of the disclosure, there is provided a method at a user plane function node. The method comprises detecting that a user plane path is failed; and sending a failure report of the user plane path to a control plane function node. The failure report of the user plane path includes information of an Internet protocol address, a destination interface and a network instance of a sending node towards which the user plane path failure has been detected, wherein the destination interface identifies an access or core interface of the sending node.

In an embodiment, the method may further comprise monitoring the user plane path within a configurable period to determine whether the user plane path is recovered or not, wherein sending the failure report of the user plane path to the control plane function node is in response to the user plane path is not recovered within the configurable period.

In a fourth aspect of the disclosure, there is provided a method at a control plane function node. The method comprises receiving a failure report of the user plane path from a user plane function node; and processing the failure report of the user plane path, wherein the failure report of the user plane path includes information of an Internet protocol address, a destination interface and a network instance of a sending node towards which the user plane path failure has been detected, wherein the destination interface identifies an access or core interface of the sending node.

In an embodiment, the method may further comprise locating bearer contexts or protocol data unit (PDU) sessions associated with the failed user plane path by using the information of the Internet protocol address, the destination interface and the network instance.

In a fifth aspect of the disclosure, there is provided an apparatus at a user plane function node. The apparatus comprises a processor; and a memory coupled to the processor, said memory containing instructions executable by said processor, whereby said apparatus is operative to detect that a user plane path is failed; monitor the user plane path within a configurable period to determine whether the user plane path is recovered or not.

In a sixth aspect of the disclosure, there is provided an apparatus at a control plane function node. The apparatus comprises a processor; and a memory coupled to the processor, said memory containing instructions executable by said processor, whereby said apparatus is operative to send a configurable period to a user plane function node, wherein the configurable period is used by the user plane function node to monitor a user plane path within the configurable period to determine whether the user plane path is recovered or not after detecting that the user plane path is failed; and receive a monitoring result from the user plane function node.

In a seventh aspect of the disclosure, there is provided an apparatus at a user plane function node. The apparatus comprises a processor; and a memory coupled to the processor, said memory containing instructions executable by said processor, whereby said apparatus is operative to detect that a user plane path is failed; and send a failure report of the user plane path to a control plane function node. The failure report of the user plane path includes information of an Internet protocol address, a destination interface and a network instance of a sending node towards which the user plane path failure has been detected, wherein the destination interface identifies an access or core interface of the sending node.

In an eighth aspect of the disclosure, there is provided an apparatus at a control plane function node. The apparatus comprises a processor; and a memory coupled to the processor, said memory containing instructions executable by said processor, whereby said apparatus is operative to receive a failure report of the user plane path from a user plane function node; and process the failure report of the user plane path. The failure report of the user plane path includes information of an Internet protocol address, a destination interface and a network instance of a sending node towards which the user plane path failure has been detected, wherein the destination interface identifies an access or core interface of the sending node.

In a ninth aspect of the disclosure, there is provided a computer program product comprising instructions which, when executed on at least one processor, cause the at least one processor to carry out the method according to the first aspect of the disclosure.

In a tenth aspect of the disclosure, there is provided a computer program product comprising instructions which, when executed on at least one processor, cause the at least one processor to carry out the method according to the second aspect of the disclosure.

In an eleventh aspect of the disclosure, there is provided a computer program product comprising instructions which, when executed on at least one processor, cause the at least one processor to carry out the method according to the third aspect of the disclosure.

In a twelfth aspect of the disclosure, there is provided a computer program product comprising instructions which, when executed on at least one processor, cause the at least one processor to carry out the method according to the fourth aspect of the disclosure.

In a thirteenth aspect of the disclosure, there is provided a computer-readable storage medium storing instructions which, when executed on at least one processor, cause the at least one processor to carry out the method according to the first aspect of the disclosure.

In a fourteenth aspect of the disclosure, there is provided a computer-readable storage medium storing instructions which, when executed on at least one processor, cause the at least one processor to carry out the method according to the second aspect of the disclosure.

In a fifteenth aspect of the disclosure, there is provided a computer-readable storage medium storing instructions which, when executed on at least one processor, cause the at least one processor to carry out the method according to the third aspect of the disclosure.

In a sixteenth aspect of the disclosure, there is provided a computer-readable storage medium storing instructions which, when executed on at least one processor, cause the at least one processor to carry out the method according to the fourth aspect of the disclosure.

Some embodiments of the disclosure can avoid the deletion of bearers or PDU sessions in case of transient user plane failure. Some embodiments of the disclosure can enable the CP function to correctly and efficiently identify the impacted bearers or PDU sessions.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 14 illustrates example Information elements, Destination Interface and Network Instance according to an embodiment of the present disclosure.

DETAILED DESCRIPTION

Figure 1:
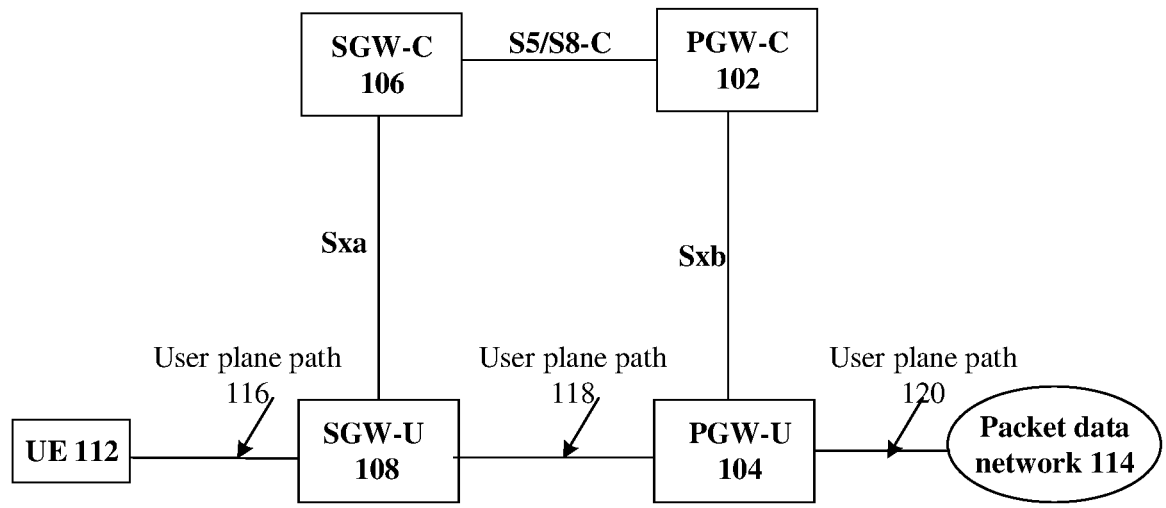
FIG. 1 schematically shows a system according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless/wired communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by some of standards organizations such as 3GPP. For example, the communication protocols as defined by 3GPP may comprise the third generation (3G), fourth generation (4G), 4.5G, the fourth generation (5G) communication protocols, and/or any other protocols either currently known or to be developed in the future.

The term "network device" or "network node" used herein refers to a network device such as a core network device in a communication network. For example, in a wireless communication network such as a 3GPP-type cellular network, the network node may comprise a control plane function node (e.g., Session Management Function (SMF), PGW-C and SGW-C) and a user plane function node (e.g., User plane Function (UPF), PGW-U and SGW-U), etc., which may offer numerous services to customers who are interconnected by an access network device. Each access network device is connectable to the core network device over a wired or wireless connection.

The term "network function (NF)" refers to any suitable function which can be implemented in a network node such as a core network node of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (NF Repository Function), RAN (radio access network), etc. In other embodiments, the network function may comprise different types of NFs for example depending on a specific type of network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VOIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IOT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 2:
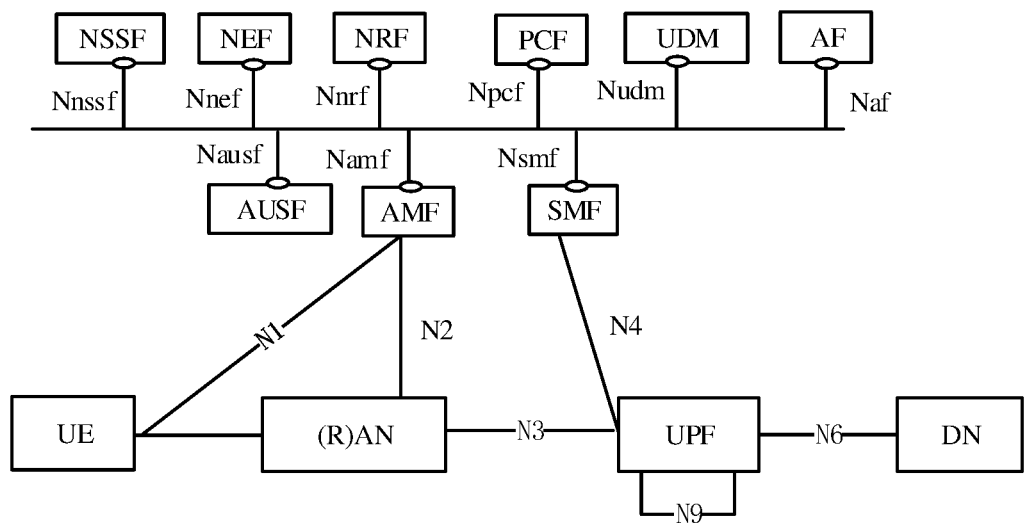
FIG. 2 schematically shows another system according to an embodiment of the present disclosure.

Although the subject matter described herein may be implemented in any appropriate type of system using any suitable components, the embodiments disclosed herein are described in relation to a communication system complied with the exemplary system architecture illustrated in FIG. 1 and FIG. 2.

FIG. 1 schematically shows a system according to an embodiment of the present disclosure. As shown in FIG. 1, the system 100 may comprise a PGW-C 102, a PGW-U 104, a SGW-C 106, a SGW-U 108, a UE 112, a packet data network 114. User plane paths 116, 118 and 120 may be used by the UE 112 to connect to the packet data network 114. It is noted that the user plane paths 116, 118 and 120 may include any other suitable network devices (not shown in FIG. 1). For example, there may be RAN such as eNodeB or gNodeB in the user plane path 116. The system 100 may be CUPS architecture as defined in 3GPP TS23.214. With CUPS, Sxb interface is defined between PGW-C and PGW-U, Sxa interface is defined between SGW-C and SGW-U, and S5/S8 interface is defined between PGW-C and SGW-C. This enables flexible network deployment and operation and the independent scaling between control plane and user plane functions while not affecting the functionality of the existing nodes subject to this split. It is noted that there may be multiple UEs though only one UE is shown in the system 100. Each PGW-C may manage/control one or more PGW-Us though only one PGW-U is shown in the system 100. Each SGW-C may manage/control multiple SGW-Us though only one SGW-U is shown in the system 100. Each PGW-C may be connected to one or more SGW-Cs though only one SGW-C is shown in the system 100. Each SGW-C may be connected to one or more PGW-Cs though only one PGW-C is shown in the system 100.

FIG. 2 schematically shows a high level architecture in the next generation network such as 5G. For simplicity, the system architecture of FIG. 2 only depicts some exemplary elements such as AUSF, AMF, DN, NEF, NRF, NSSF, PCF, SMF, UDM, UPF, AF, UE, (R)AN. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

In accordance with an exemplary embodiment, the UE can establish a signaling connection with the AMF over the reference point N1, as illustrated in FIG. 2. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a packet data unit (PDU) session to the DN (data network, e.g. an operator network or Internet) through the UPF over the reference point N6.

As further illustrated in FIG. 2, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 2 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 2 may be responsible for functions such as session management, mobility management, authentication, and security. These may be critical for delivering a service in the network. The AUSF, AMF, DN, NEF, NRF, NSSF, PCF, SMF, UDM, UPF, AF, UE, (R)AN may include the functionality for example as defined in clause 6.2 of 3GPP TS23.501 V15.4.0, the disclosure of which is incorporated by reference herein in its entirety. For example, the NEF may act as a gateway which can enable external users to monitor, provision and enforce an application policy for users inside the network. The AUSF may be configured as an authentication server. The UDM can store subscriber data and profiles. The PCF can provide a policy framework incorporating network slicing, roaming and mobility management. The AMF can manage access control and mobility. The SMF can set up and manage sessions according to a network policy. The UPF can be deployed in various configurations and locations according to the service type.

Figure 3:
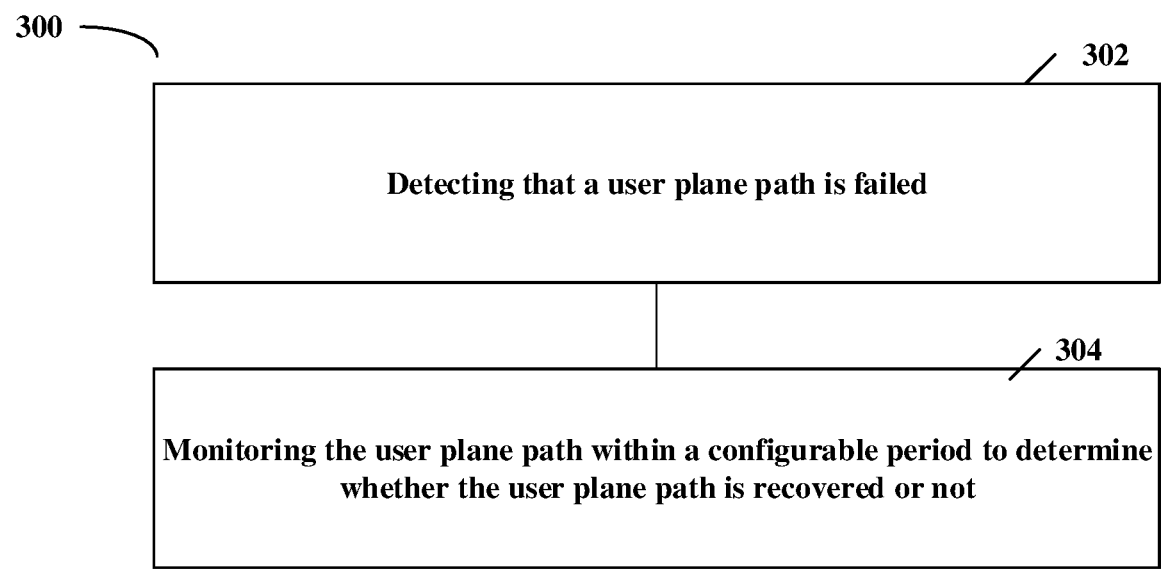
FIG. 3 shows a flowchart of a method according to an embodiment of the present disclosure.

FIG. 3 shows a flowchart of a method according to an embodiment of the present disclosure, which may be performed by an apparatus implemented in a user plane function node or communicatively coupled to a user plane function node. As such, the apparatus may provide means for accomplishing various parts of the method 300 as well as means for accomplishing other processes in conjunction with other components. The user plane function node may be any suitable node which can implement the user plane function. For example, the user plane function node may be SGW-U, PGW-U or UPF.

At block 302, the user plane function node such as SGW-U, PGW-U or UPF detects that a user plane path is failed. The user plane function node may detect that a user plane path is failed in various ways for example depending on different protocol requirements, Quality of Service (QOS) requirement, Quality of Experience (QoE) requirement, etc. For example, as described in subclause 20.3.1 of 3GPP TS 23.007 V15.1.0, the user plane function node such as GTP-U entities shall support detection of path failure by using Echo Request/Echo Response messages in the following way. A path counter shall be reset each time an Echo Response is received on the path and incremented when the T3-RESPONSE timer expires for any Echo Request message sent on the path. The path shall be considered to be down if the counter exceeds N3-REQUESTS.

At block 304, the user plane function node such as SGW-U, PGW-U or UPF monitors the user plane path within a configurable period to determine whether the user plane path is recovered or not. The configurable period may be obtained in various ways such as predefined, preconfigured or configured. In addition, the configurable period may be updated or modified. The configurable period may have different values for example depending on the specific communication networks or applications. In addition, different user plane paths may have same or different configurable periods.

Figure 4:
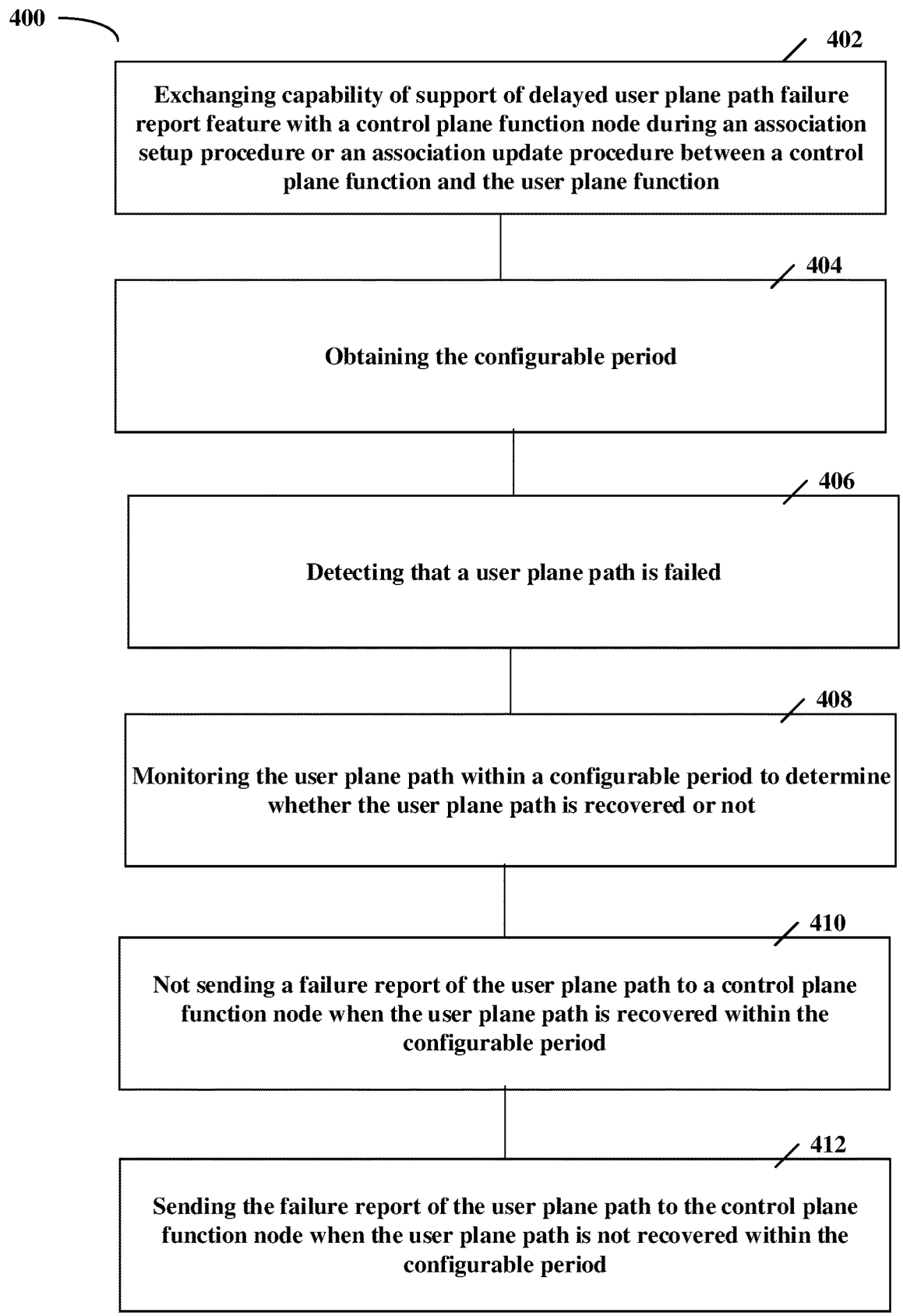
FIG. 4 shows a flowchart of a method according to another embodiment of the present disclosure.

FIG. 4 shows a flowchart of a method according to another embodiment of the present disclosure, which may be performed by an apparatus implemented in a user plane function node or communicatively coupled to a user plane function node. As such, the apparatus may provide means for accomplishing various parts of the method 400 as well as means for accomplishing other processes in conjunction with other components. The user plane function node may be any suitable node which can implement the user plane function. For example, the user plane function node may be SGW-U, PGW-U or UPF. Blocks 406 and 408 are similar to blocks 302 and 304, the description of these blocks is omitted here for brevity.

At block 402, the user plane function node may exchange capability of support of delayed user plane path failure report feature with a control plane function node during an association setup procedure or an association update procedure between a control plane function and the user plane function. The capability of support of delayed user plane path failure report feature may be indicated in various ways. In an embodiment, the capability of support of delayed user plane path failure report feature may be indicated by a feature bit. For example, the CP function node and the UP function node may exchange the capability of support of delayed user plane path failure. UP function may include delayed user plane path failure report feature bit in UP Function Features in Packet Forwarding Control Protocol (PFCP) Association Setup Request or PFCP Association Update Request or PFCP Association Setup Response or PFCP Association Update Response. CP function may include delayed user plane path failure report feature bit in CP Function Features in PFCP Association Setup Request or PFCP Association Update Request or PFCP Association Setup Response or PFCP Association Update Response.

At block 404, the user plane function node obtains the configurable period. The user plane function node may obtain the configurable period in various ways. As a first example, the user plane function node may obtain the configurable period locally when the configurable period is configured locally in the user plane function node. As a second example, the user plane function node may obtain the configurable period from a control plane function node. When the configurable period is obtained from another node, the configurable period may be included in any suitable message or a dedicated message.

In an embodiment, when the configurable period is obtained from the control plane function node, the configurable period may be obtained from at least one of a Packet Forwarding Control Protocol (PFCP) association setup request, a PFCP association setup response, a PFCP association update request and a PFCP association update response. In addition, the CP function can also include user plane failure report delay information together with the feature indication of delayed user plane path failure report.

At block 406, the user plane function node detects that a user plane path is failed.

At block 408, the user plane function node monitors the user plane path within the configurable period to determine whether the user plane path is recovered or not.

At block 410, the user plane function node does not send a failure report of the user plane path to the control plane function node when the user plane path is recovered within the configurable period. In this way, there is no message overhead of the failure report of the user plane path and CP function node will avoid handling of the associated bearer contexts or PDU sessions associated with the recovered user plane path.

Alternatively, at block 412, the user plane function node sends the failure report of the user plane path to the control plane function node when the user plane path is not recovered within the configurable period. In this case, the CP function node will delete the associated bearer contexts immediately since the CP function node knows that the user plane path is not recovered within the configurable period.

Figure 5:
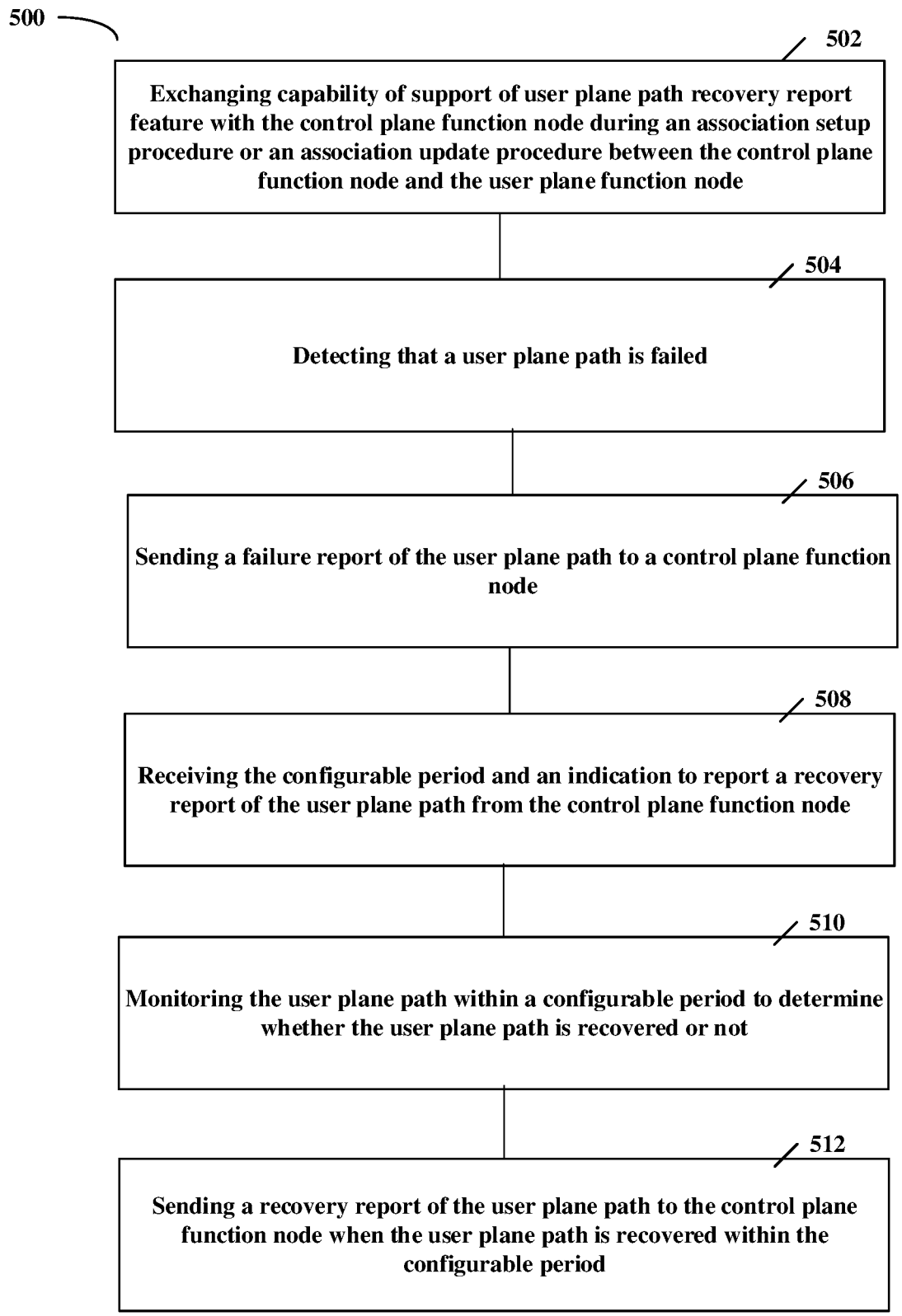
FIG. 5 shows a flowchart of a method according to another embodiment of the present disclosure.

FIG. 5 shows a flowchart of a method according to another embodiment of the present disclosure, which may be performed by an apparatus implemented in a user plane function node or communicatively coupled to a user plane function node. As such, the apparatus may provide means for accomplishing various parts of the method 500 as well as means for accomplishing other processes in conjunction with other components. The user plane function node may be any suitable node which can implement the user plane function. For example, the user plane function node may be SGW-U, PGW-U or UPF. Blocks 504 and 510 are similar to blocks 302 and 304, the description of these blocks is omitted here for brevity.

At block 502, the user plane function node exchanges capability of support of user plane path recovery report feature with the control plane function node during an association setup procedure or an association update procedure between the control plane function node and the user plane function node. The capability of support of user plane path recovery report feature is indicated in various ways. In an embodiment, the capability of support of user plane path recovery report feature is indicated by a feature bit. For example, CP function node and UP function node may exchange the capability of support of user plane path recovery report. Both CP function node and UP function node includes user plane path recovery report feature bit in CP Function Features and UP Function Features respectively in PFCP Association Setup Request or PFCP Association Update Request or PFCP Association Setup Response or PFCP Association Update Response.

At block 504, the user plane function node detects that a user plane path is failed.

At block 506, the user plane function node sends a failure report of the user plane path to the control plane function node. The failure report of the user plane path may be included in any suitable messages. For example, the failure report of the user plane path may be included in a Packet Forwarding Control Protocol (PFCP) node report request message.

At block 508, the user plane function node receives the configurable period and an indication to report a recovery report of the user plane path from the control plane function node. The configurable period and the indication may be included in any suitable messages. For example, when the CP function node receives the PFCP node report request message including the failure report of the user plane path, it may answer with PFCP Node Report Response message. In this message, the configurable period and the indication are included to request the UP function to report the user plane path recovery if the user plane path is recovered within the configurable period.

At block 510, the user plane function node monitors the user plane path within the configurable period to determine whether the user plane path is recovered or not.

At block 512, the user plane function node sends a recovery report of the user plane path to the control plane function node when the user plane path is recovered within the configurable period. When receiving this user plane recovery report, the control plane function node may remove monitoring of the associated bearers or PDU sessions and keeps them as normal. The configurable period and the indication may be included in any suitable messages. In an embodiment, the recovery report of the user plane path is included in a PFCP node report request message. The recovery report of the user plane path may include any suitable information which can be used by the control plane function node to identify which user plane path is recovered within the configurable period. The content of recovery report of the user plane path may be different for example depending on the specific communication network.

In various embodiments, the recovery report of the user plane path includes information of an Internet protocol address, a destination interface and a network instance of a sending node towards which the user plane path has been recovered from failure, wherein the destination interface identifies an access or core interface of the sending node.

In various embodiments, the failure report of the user plane path includes information of an Internet protocol address, a destination interface and a network instance of a sending node towards which the user plane path failure has been detected, wherein the destination interface identifies an access or core interface of the sending node.

Figure 6:
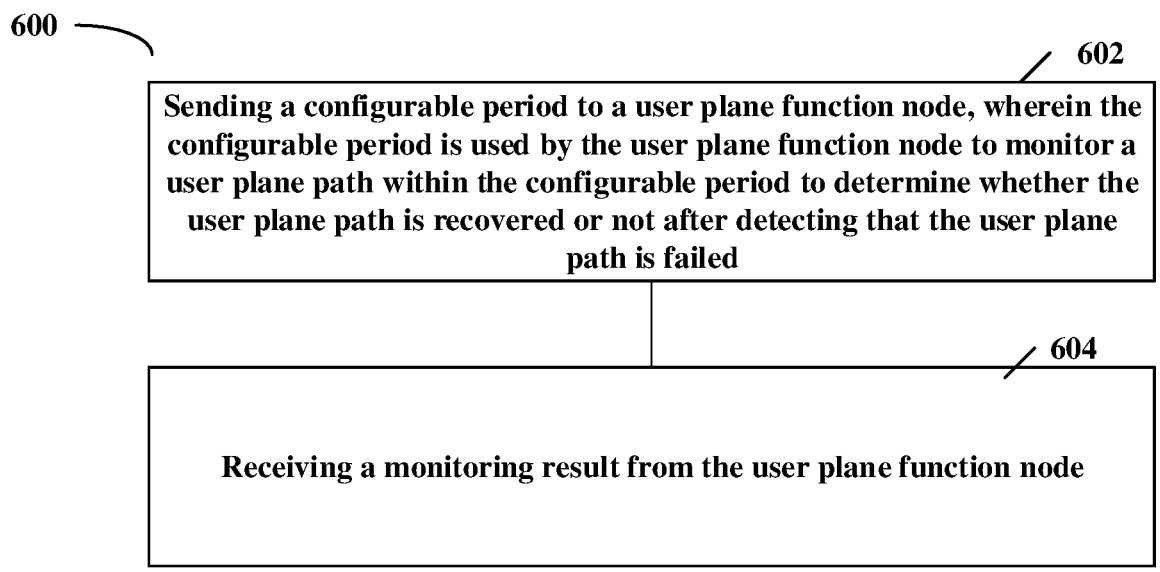
FIG. 6 shows a flowchart of a method according to another embodiment of the present disclosure.

FIG. 6 shows a flowchart of a method according to another embodiment of the present disclosure, which may be performed by an apparatus implemented in a control plane function node or communicatively coupled to a control plane function node. As such, the apparatus may provide means for accomplishing various parts of the method 600 as well as means for accomplishing other processes in conjunction with other components. The control plane function node may be any suitable node which can implement the control plane function. For example, the user plane function node may be SGW-C, PGW-C or SMF. For some parts which have been described in the above embodiments, the description thereof is omitted here for brevity.

At block 602, the control plane function node sends a configurable period to a user plane function node. The configurable period is used by the user plane function node to monitor a user plane path within the configurable period to determine whether the user plane path is recovered or not after detecting that the user plane path is failed as described above. The configurable period may be sent in any suitable messages.

At block 604, the control plane function node receives a monitoring result from the user plane function node. For example, as described above, when the user plane function node receives the configurable period and detects a user plane path is failed, it may monitor the failed user plane path within the configurable period to determine whether the failed user plane path is recovered or not. The monitoring result may include any suitable information. As a first example, when the user plane function node receives the configurable period before detecting that the user plane path is failed, the user plane function node will not send a failure report of the user plane path to the control plane function node when the user plane path is recovered within the configurable period. Alternatively, the user plane function node may send the failure report of the user plane path to the control plane function node when the user plane path is not recovered within the configurable period. As a second example, when the user plane function node receives the configurable period after detecting that the user plane path is failed, the user plane function node may send a recovery report of the user plane path to the control plane function node when the user plane path is recovered within the configurable period.

Figure 7:
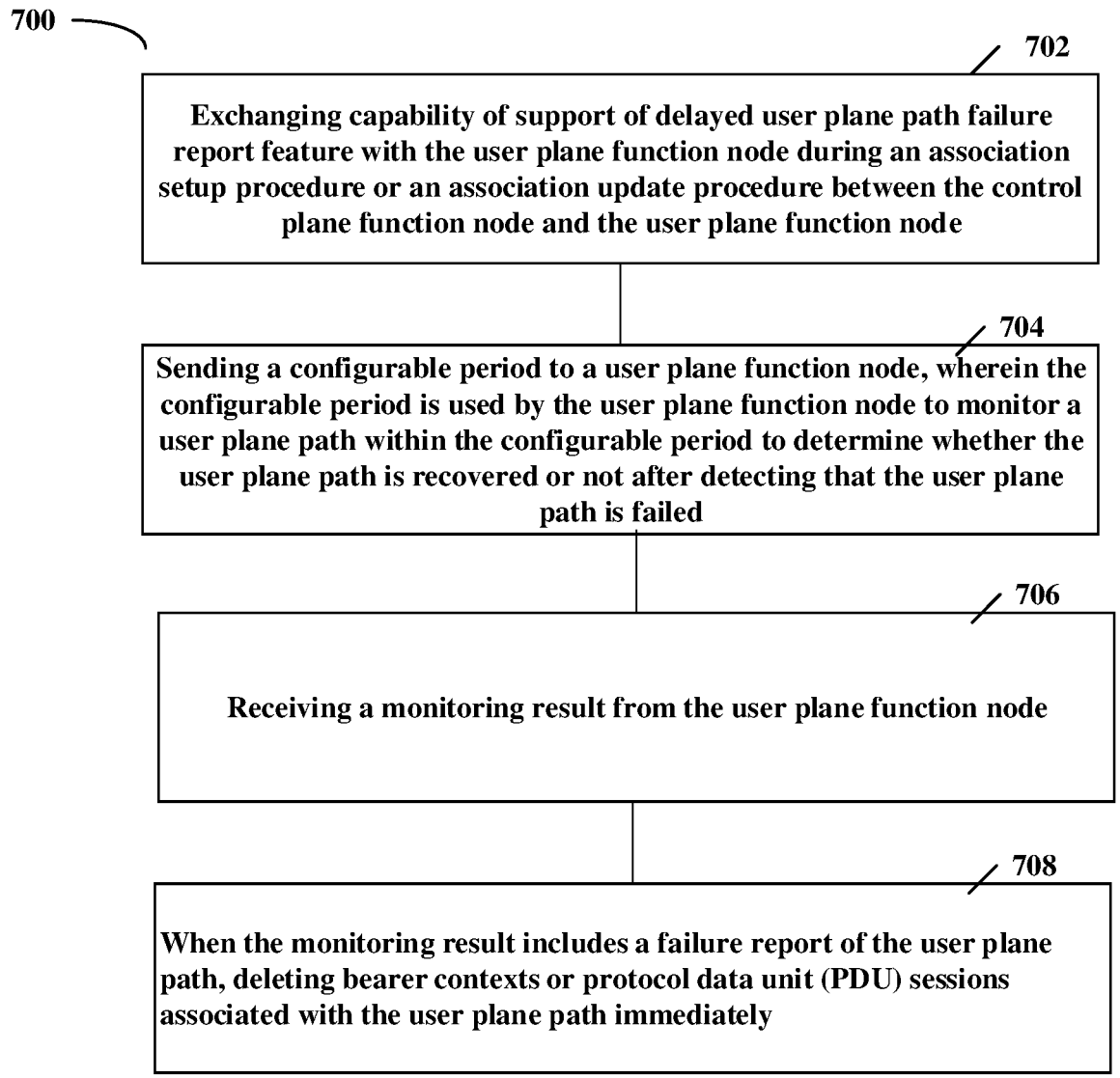
FIG. 7 shows a flowchart of a method according to another embodiment of the present disclosure.

FIG. 7 shows a flowchart of a method according to another embodiment of the present disclosure, which may be performed by an apparatus implemented in a control plane function node or communicatively coupled to a control plane function node. As such, the apparatus may provide means for accomplishing various parts of the method 700 as well as means for accomplishing other processes in conjunction with other components. The control plane function node may be any suitable node which can implement the control plane function. For example, the user plane function node may be SGW-C, PGW-C or SMF. For some parts which have been described in the above embodiments, the description thereof is omitted here for brevity.

At block 702, the control plane function node exchanges capability of support of delayed user plane path failure report feature with the user plane function node during an association setup procedure or an association update procedure between the control plane function node and the user plane function node.

At block 704, the control plane function node sends a configurable period to a user plane function node. In this embodiment, the configurable period may be sent in at least one of a Packet Forwarding Control Protocol (PFCP) association setup request, a PFCP association setup response, a PFCP association update request and a PFCP association update response. For example, the capability of support of delayed user plane path failure report feature together with the configurable period may be sent to the user plane function node in a same message. When the user plane function node receives the configurable period and detects that a user plane path is failed, it may monitor the user plane path within the configurable period to determine whether the user plane path is recovered or not as described above.

At block 706, the control plane function node receives a monitoring result from the user plane function node.

At block 708, when the monitoring result includes a failure report of the user plane path, the control plane function node deletes bearer contexts or protocol data unit (PDU) sessions associated with the user plane path immediately since the control plane node knows that the failed user plane path is not recovered within the configurable period. In addition, when the control plane function node does not receive the monitoring result from the user plane function node, the control plane function node may deem that there is not any failed user plane path or the failed user path has been recovered within the configurable period.

Figure 8:
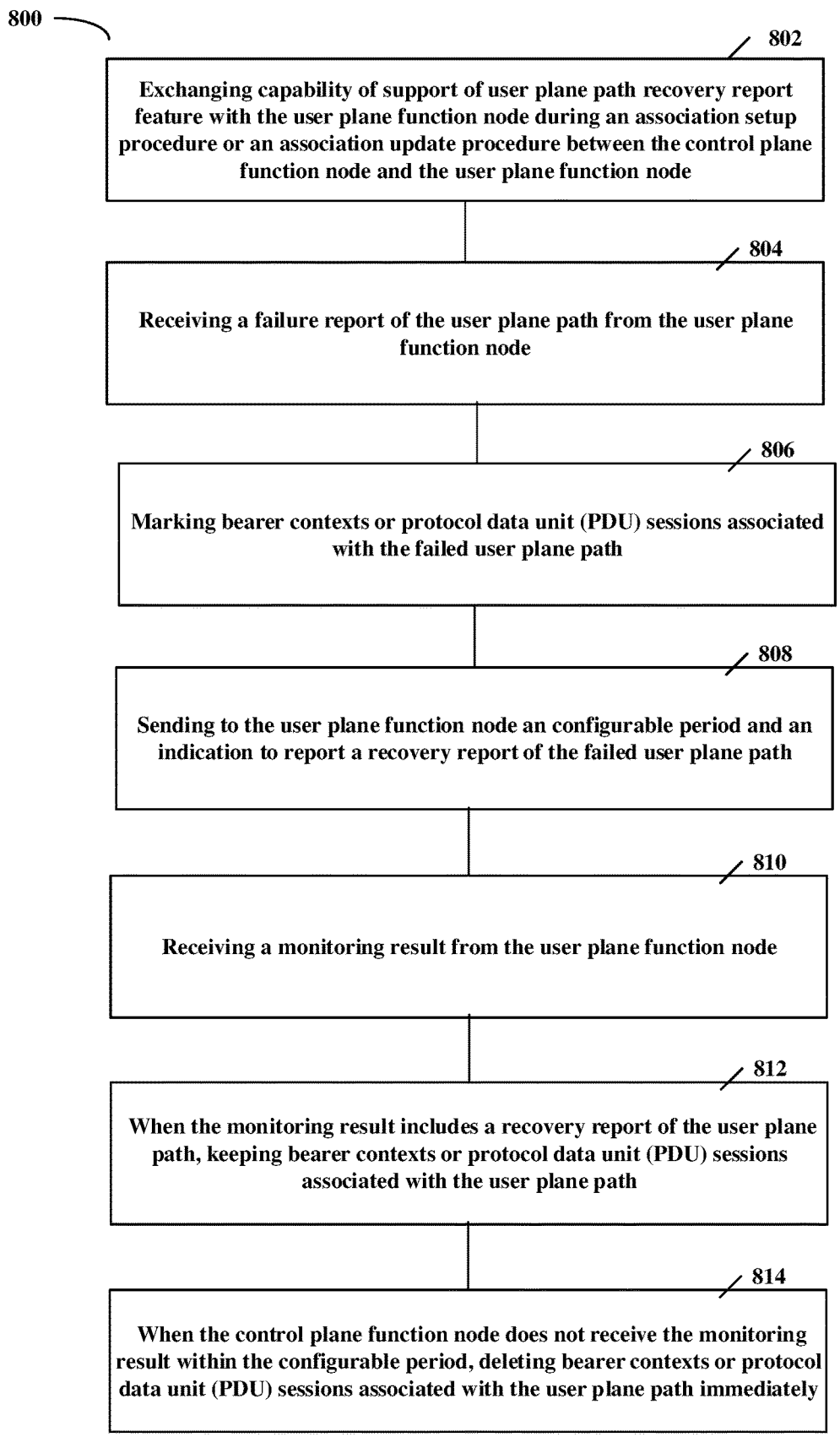
FIG. 8 shows a flowchart of a method according to another embodiment of the present disclosure.

FIG. 8 shows a flowchart of a method according to another embodiment of the present disclosure, which may be performed by an apparatus implemented in a control plane function node or communicatively coupled to a control plane function node. As such, the apparatus may provide means for accomplishing various parts of the method 800 as well as means for accomplishing other processes in conjunction with other components. The control plane function node may be any suitable node which can implement the control plane function. For example, the user plane function node may be SGW-C, PGW-C or SMF. For some parts which have been described in the above embodiments, the description thereof is omitted here for brevity.

At block 802, the control plane function node exchanges capability of support of user plane path recovery report feature with the user plane function node during an association setup procedure or an association update procedure between the control plane function node and the user plane function node.

At block 804, the control plane function node receives a failure report of the user plane path from the user plane function node. In an embodiment, the failure report of the user plane path may be received in a Packet Forwarding Control Protocol (PFCP) node report request.

At block 806, the control plane function node marks bearer contexts or protocol data unit (PDU) sessions associated with the failed user plane path. For example, the control plane function node may mark bearer contexts or protocol data unit (PDU) sessions associated with the failed user plane path by using information of the failure report of the user plane path. In an embodiment, the failure report of the user plane path may include information of a destination interface and a network instance, wherein the destination interface identifies an access or core interface of a sending node which is associated with the failed user plane path, wherein the network instance identifies the network instance of the sending node which is associated with the failed user plane.

At block 808, the control plane function node sends to the user plane function node the configurable period and an indication to report a recovery report of the failed user plane path. In an embodiment, the failure report of the user plane path may be received in a Packet Forwarding Control Protocol (PFCP) node report request, and the configurable period and the indication may be sent in a PFCP node report response At block 810, the control plane function node receives a monitoring result from the user plane function node.

At block 812, when the monitoring result includes a recovery report of the user plane path, the control plane function node may keep bearer contexts or protocol data unit (PDU) sessions associated with the user plane path.

At block 814, when the control plane function node does not receive the monitoring result within the configurable period, the control plane function node may deem that the failed user plane path is not recovered within the configurable period and delete bearer contexts or protocol data unit (PDU) sessions associated with the user plane path immediately.

In an embodiment, the recovery report of the user plane path may include information of an Internet protocol address, a destination interface and a network instance of a sending node towards which the user plane path has been recovered from failure, wherein the destination interface identifies an access or core interface of the sending node.

In an embodiment, the failure report of the user plane path may include information of a destination interface and a network instance, wherein the destination interface identifies an access or core interface of a sending node which is associated with the failed user plane path, wherein the network instance identifies the network instance of the sending node which is associated with the failed user plane path.

Comparing with the existing methods for example as described in subclauses 20.3.1 and 20.3.4 of 3GPP TS23.007, i.e., the control plane function may be configured with an operator configurable maximum path failure duration, so only when the period is expired, the CP function will then decide to delete the bearer contexts or protocol data unit (PDU) sessions. While after the User Plane function has reported the path failure, the user plane path failure may be recovered during the period of the operator configurable maximum path failure duration. In this case, CP triggered deleting of the bearer contexts or PDU sessions has no value but instead adds signaling in the network and impacts the user experience. The above embodiment can solve these problems and avoid the deletion of bearers PDU sessions in case of transient user plane path failure.

Figure 9:
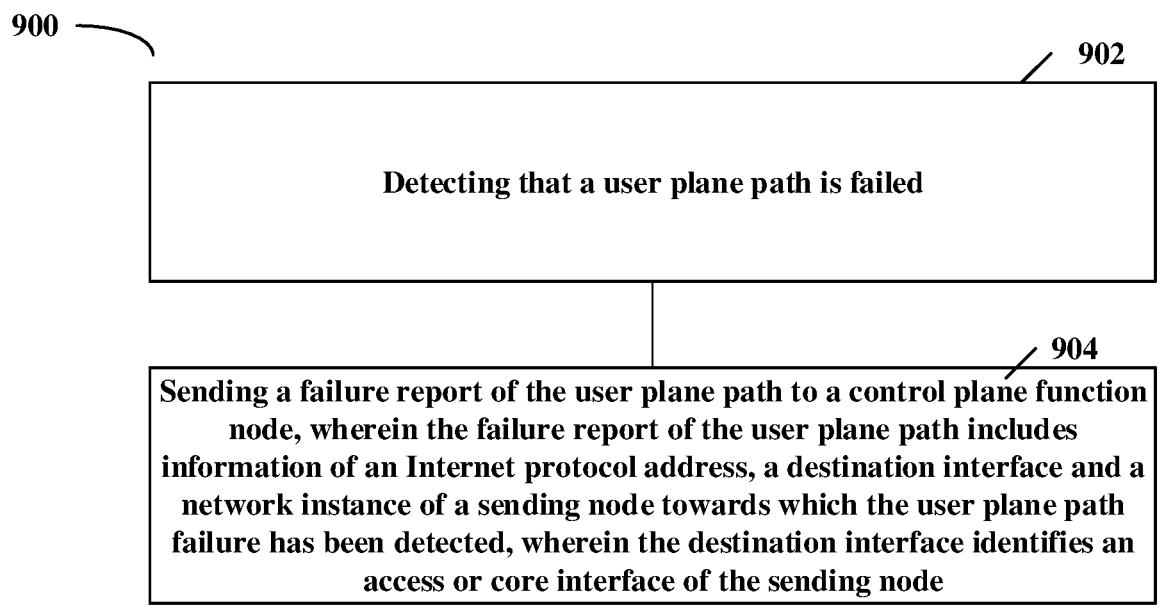
FIG. 9 shows a flowchart of a method according to another embodiment of the present disclosure.

FIG. 9 shows a flowchart of a method according to another embodiment of the present disclosure, which may be performed by an apparatus implemented in a user plane function node or communicatively coupled to a user plane function node. As such, the apparatus may provide means for accomplishing various parts of the method 900 as well as means for accomplishing other processes in conjunction with other components. The control plane function node may be any suitable node which can implement the control plane function. For example, the user plane function node may be SGW-U, PGW-U or UPF. For some parts which have been described in the above embodiments, the description thereof is omitted here for brevity.

At block 902, the user plane function node detects that a user plane path is failed.

At block 904, the user plane function node sends a failure report of the user plane path to a control plane function node.

In an embodiment, the failure report of the user plane path includes information of an Internet protocol address, a destination interface and a network instance of a sending node towards which the user plane path failure has been detected, wherein the destination interface identifies an access or core interface of the sending node.

Figure 10:
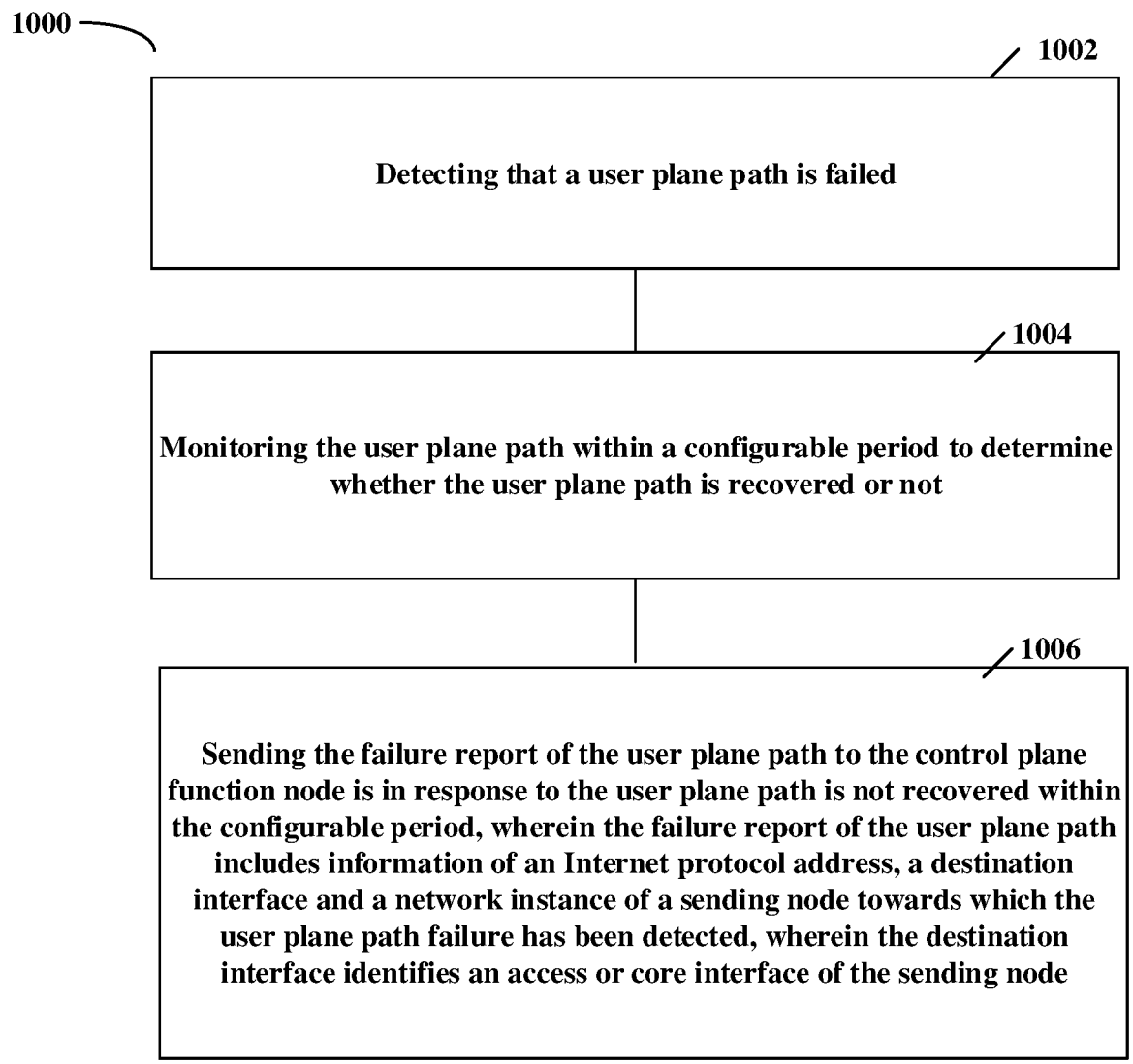
FIG. 10 shows a flowchart of a method according to another embodiment of the present disclosure.

FIG. 10 shows a flowchart of a method according to another embodiment of the present disclosure, which may be performed by an apparatus implemented in a user plane function node or communicatively coupled to a user plane function node. As such, the apparatus may provide means for accomplishing various parts of the method 1000 as well as means for accomplishing other processes in conjunction with other components. The control plane function node may be any suitable node which can implement the control plane function. For example, the user plane function node may be SGW-U, PGW-U or UPF. For some parts which have been described in the above embodiments, the description thereof is omitted here for brevity.

At block 1002, the user plane function node detects that a user plane path is failed.

At block 1004, the user plane function node monitors the user plane path within a configurable period to determine whether the user plane path is recovered or not.

At block 1006, the user plane function node sends the failure report of the user plane path to the control plane function node in response to the user plane path is not recovered within the configurable period.

In an embodiment, the failure report of the user plane path includes information of an Internet protocol address, a destination interface and a network instance of a sending node towards which the user plane path failure has been detected, wherein the destination interface identifies an access or core interface of the sending node.

Figure 11:
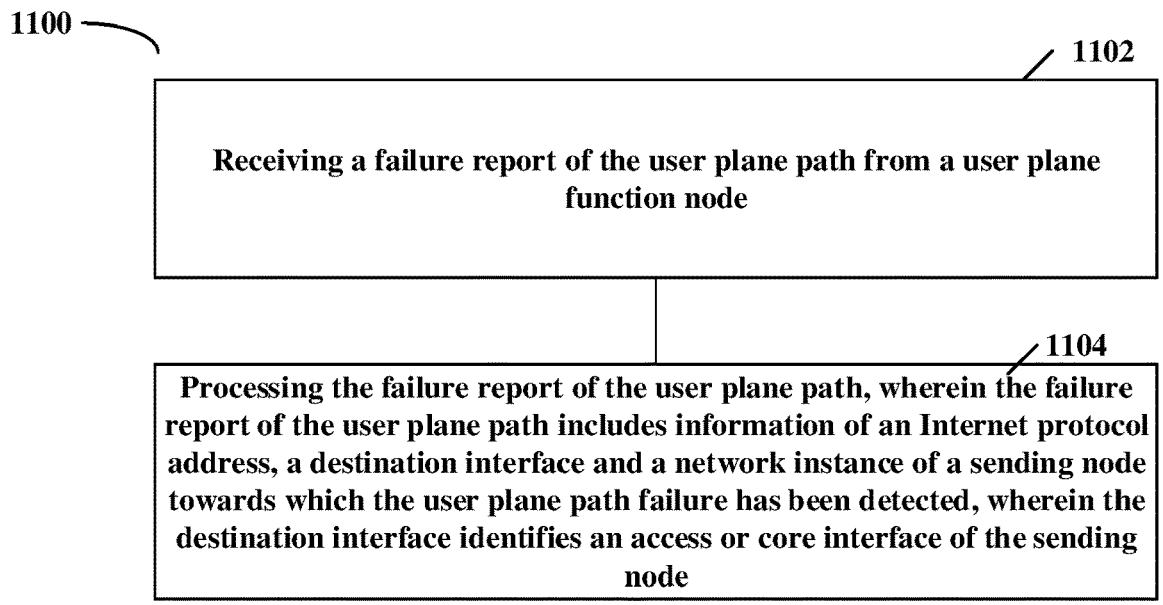
FIG. 11 shows a flowchart of a method according to another embodiment of the present disclosure.

FIG. 11 shows a flowchart of a method according to another embodiment of the present disclosure, which may be performed by an apparatus implemented in a control plane function node or communicatively coupled to a control plane function node. As such, the apparatus may provide means for accomplishing various parts of the method 1100 as well as means for accomplishing other processes in conjunction with other components. The control plane function node may be any suitable node which can implement the control plane function. For example, the user plane function node may be SGW-C, PGW-C or SMF. For some parts which have been described in the above embodiments, the description thereof is omitted here for brevity.

At block 1102, the control plane function node receives a failure report of the user plane path from a user plane function node.

At block 1104, the control plane function node processes the failure report of the user plane path. For example, depending on the specific communication network, the control plane function node may perform different processes on the failure report of the user plane path.

In an embodiment, the failure report of the user plane path includes information of an Internet protocol address, a destination interface and a network instance of a sending node towards which the user plane path failure has been detected, wherein the destination interface identifies an access or core interface of the sending node.

Figure 12:
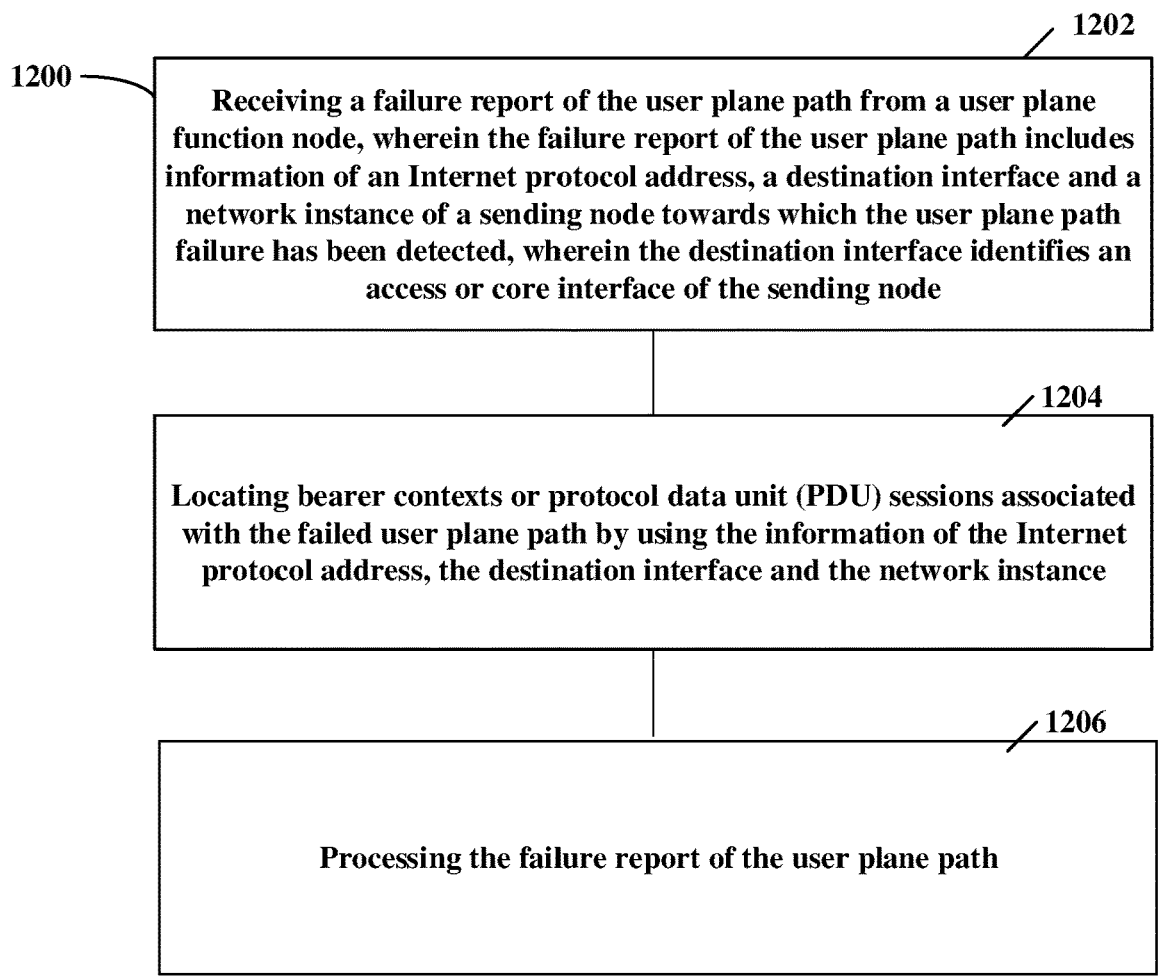
FIG. 12 shows a flowchart of a method according to another embodiment of the present disclosure.

FIG. 12 shows a flowchart of a method according to another embodiment of the present disclosure, which may be performed by an apparatus implemented in a control plane function node or communicatively coupled to a control plane function node. As such, the apparatus may provide means for accomplishing various parts of the method 1200 as well as means for accomplishing other processes in conjunction with other components. The control plane function node may be any suitable node which can implement the control plane function. For example, the user plane function node may be SGW-C, PGW-C or SMF. For some parts which have been described in the above embodiments, the description thereof is omitted here for brevity.

At block 1202, the control plane function node receives a failure report of the user plane path from a user plane function node.

In an embodiment, the failure report of the user plane path includes information of an Internet protocol address, a destination interface and a network instance of a sending node towards which the user plane path failure has been detected, wherein the destination interface identifies an access or core interface of the sending node.

At block 1204, the control plane function node locates bearer contexts or protocol data unit (PDU) sessions associated with the failed user plane path by using the information of the Internet protocol address, the destination interface and the network instance.

At block 1206, the control plane function node processes the failure report of the user plane path.

In various embodiments, the user plane function node comprises a PGW-U node and the control plane function node comprises a PGW-C node, or the user plane function node comprises a SGW-U node and the control plane function node comprises a SGW-C node, or the user plane function node comprises a UPF node and the control plane function node comprises a SMF node.

In an embodiment, Table 7.4.5.1.2-1 of 3GPP TS 29.244 V15.4.0 may add new Information elements Destination Interface and Network Instance as shown in FIG. 14.

The information carried in User Plane Path Failure Report IE only includes Remote GTP-U Peer information but it does not include destination interface IE and network instance IE as included in Forwarding Action Rules. This will make it inefficient and costly for CP function to identify the associated bearers. Furthermore, if the remote IP address is overlapping with each other (e.g., remote S1-U IP address is overlapping with remote S5-U IP address or if one remote S1-U IP in IP domain X is overlapping with another remote S1-U IP address in IP domain Y), CP function cannot identify the associated bearers correctly. The above embodiments can enables the CP function to correctly and efficiently identify the impacted bearers or PDU sessions.

Figure 13A:
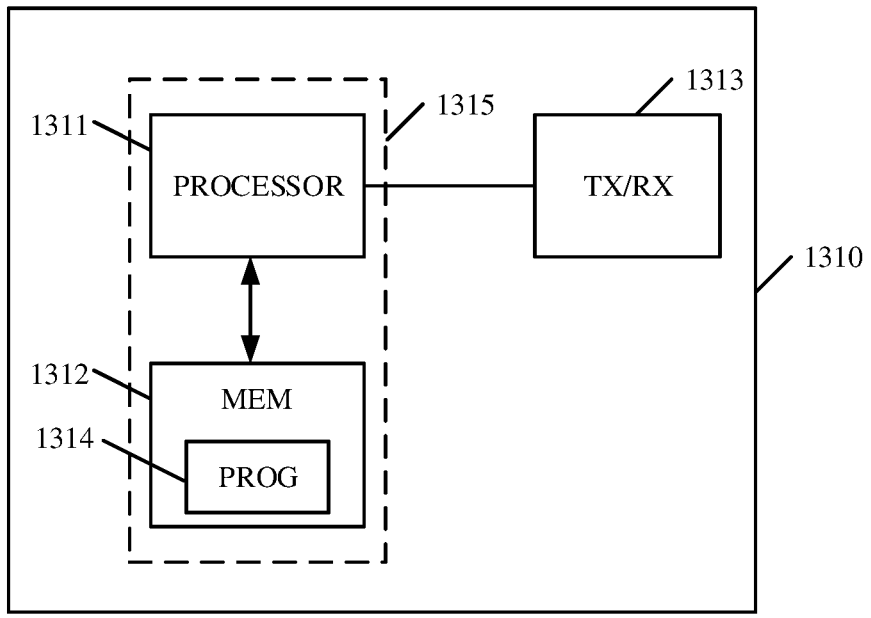
FIGS. 13a-13b illustrate simplified block diagrams of apparatuses according to an embodiment of the present disclosure.
Figure 13B:
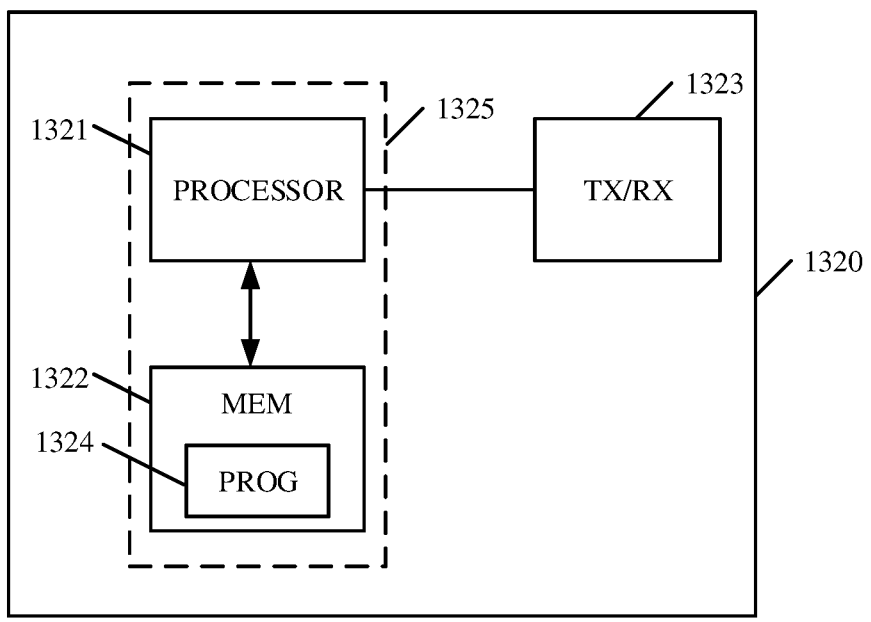

FIG. 13a illustrates a simplified block diagram of an apparatus 1310 that may be embodied in/as a user plane function according to an embodiment of the present disclosure. FIG. 13b illustrates an apparatus 1320 that may be embodied in/as a control plane function according to an embodiment of the present disclosure.

The apparatus 1310 may comprise at least one processor 1311, such as a data processor (DP) and at least one memory (MEM) 1312 coupled to the processor 1311. The apparatus 1310 may further comprise a transmitter TX and receiver RX 1313 coupled to the processor 1311. The MEM 1312 stores a program (PROG) 1314. The PROG 1314 may include instructions that, when executed on the associated processor 1311, enable the apparatus 1310 to operate in accordance with the embodiments of the present disclosure, for example to perform the methods related to the user plane function node. A combination of the at least one processor 1311 and the at least one MEM 1312 may form processing means 1315 adapted to implement various embodiments of the present disclosure.

The apparatus 1320 comprises at least one processor 1321, such as a DP, and at least one MEM 1322 coupled to the processor 1321. The apparatus 1320 may further comprise a transmitter TX and receiver RX 1323 coupled to the processor 1321. The MEM 1322 stores a PROG 1324. The PROG 1324 may include instructions that, when executed on the associated processor 1321, enable the apparatus 1320 to operate in accordance with the embodiments of the present disclosure, for example to perform the methods related to the control plane function node. A combination of the at least one processor 1321 and the at least one MEM 1322 may form processing means 1325 adapted to implement various embodiments of the present disclosure.

Various embodiments of the present disclosure may be implemented by computer program executable by one or more of the processors 1311 and 1321, software, firmware, hardware or in a combination thereof.

The MEMs 1312 and 1322 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1311 and 1321 may be of any type suitable to the local technical environment, and may include one or more of general purpose computers, special purpose computers, microprocessors, digital signal processors DSPs and processors based on multicore processor architecture, as non-limiting examples.

According to an aspect of the disclosure it is provided a computer program product being tangibly stored on a computer readable storage medium and including instructions which, when executed on at least one processor, cause the at least one processor to carry out the method related to the control plane function as described above.

According to an aspect of the disclosure it is provided a computer program product being tangibly stored on a computer readable storage medium and including instructions which, when executed on at least one processor, cause the at least one processor to carry out the method related to the user plane function as described above.

According to an aspect of the disclosure it is provided a computer-readable storage medium storing instructions which when executed by at least one processor, cause the at least one processor to perform the method related to the control plane function as described above.

According to an aspect of the disclosure it is provided a computer-readable storage medium storing instructions which when executed by at least one processor, cause the at least one processor to perform the method related to the user plane function as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a user plane function node, the method comprising:
   detecting that a user plane path is failed; and
   sending a failure report of the user plane path to a control plane function node,
   wherein the failure report of the user plane path includes information of a sending node;
   wherein the information comprises an Internet protocol address, a destination interface and a network instance towards which the user plane path failure has been detected;
   wherein the destination interface identifies an access or core interface; and
   wherein the user plane function node comprises a packet data network gateway (PGW) user plane (PGW-U) node and the control plane function node comprises a PGW control plane (PGW-C) node, or the user plane function node comprises a serving gateway (SGW) user plane (SGW-U) node and the control plane function node comprises a SGW control plane (SGW-C) node, or the user plane function node comprises a User plane Function (UPF) node and the control plane function node comprises a Session Management Function (SMF) node.

2. The method of claim 1, wherein the method further comprises monitoring the user plane path within a configurable period to determine whether the user plane path is recovered, and wherein sending the failure report of the user plane path to the control plane function node is in response to the user plane path is not recovered within the configurable period.

3. A method at a control plane function node, the method comprising:
   receiving a failure report of a user plane path from a user plane function node; and
   processing the failure report of the user plane path,
   wherein the failure report of the user plane path includes information of a sending node;
   wherein the information comprises an Internet protocol address, a destination interface and a network instance towards which the user plane path failure has been detected;
   wherein the destination interface identifies an access or core interface; and
   wherein the user plane function node comprises a packet data network gateway (PGW) user plane (PGW-U) node and the control plane function node comprises a PGW control plane (PGW-C) node, or the user plane function node comprises a serving gateway (SGW) user plane (SGW-U) node and the control plane function node comprises a SGW control plane (SGW-C) node, or the user plane function node comprises a User plane Function (UPF) node and the control plane function node comprises a Session Management Function (SMF) node.

4. The method of claim 3, wherein the method further comprises locating bearer contexts or protocol data unit (PDU) sessions associated with the failed user plane path by using the information of the Internet protocol address, the destination interface and the network instance.

5. An apparatus at a user plane function node, the apparatus comprising:
   a processor; and
   a memory coupled to the processor, said memory containing instructions executable by said processor, whereby said apparatus is operative to:
   detect that a user plane path is failed; and
   send a failure report of the user plane path to a control plane function node,
   wherein the failure report of the user plane path includes information of a sending node;
   wherein the information comprises an Internet protocol address, a destination interface and a network instance towards which the user plane path failure has been detected;
   wherein the destination interface identifies an access or core interface; and
   wherein the user plane function node comprises a packet data network gateway (PGW) user plane (PGW-U) node and the control plane function node comprises a PGW control plane (PGW-C) node, or the user plane function node comprises a serving gateway (SGW) user plane (SGW-U) node and the control plane function node comprises a SGW control plane (SGW-C) node, or the user plane function node comprises a User plane Function (UPF) node and the control plane function node comprises a Session Management Function (SMF) node.

6. The apparatus of claim 5, wherein the apparatus is further operative to monitor the user plane path within a configurable period to determine whether the user plane path is recovered, and wherein sending the failure report of the user plane path to the control plane function node is in response to the user plane path is not recovered within the configurable period.

* * * * *